United States Patent [19]

Fukuda et al.

[11] Patent Number: 4,818,640

[45] Date of Patent: Apr. 4, 1989

[54] CARBONACEOUS COMPOSITE PRODUCT PRODUCED BY JOINING CARBONACEOUS MATERIALS TOGETHER BY TETRAFLUOROETHYLENE RESIN, AND PROCESS FOR PRODUCING THE SAME

[75] Inventors: Hiroyuki Fukuda; Masatomo Shigeta; Kiyomi Ohuchi; Hisatsugu Kaji, all of Iwaki; Kuniyuki Saitoh, Abiko; Masayuki Funabashi, Iwaki, all of Japan

[73] Assignee: Kureha Kagaku Kogyo Kabushiki Kaisha, Tokyo, Japan

[21] Appl. No.: 907,977

[22] Filed: Sep. 16, 1986

[30] Foreign Application Priority Data

| Sep. 25, 1985 | [JP] | Japan | 60-211797 |
| Sep. 26, 1985 | [JP] | Japan | 60-213408 |
| Oct. 4, 1985 | [JP] | Japan | 60-221439 |
| Oct. 25, 1985 | [JP] | Japan | 60-238684 |
| Jul. 18, 1986 | [JP] | Japan | 61-169525 |
| Aug. 6, 1986 | [JP] | Japan | 61-184721 |

[51] Int. Cl.$^4$ ............................................ H01M 2/18
[52] U.S. Cl. ................................. 429/38; 429/39; 429/40; 429/44; 428/408; 428/422
[58] Field of Search ............... 429/38, 39, 40, 44; 428/408, 422

[56] References Cited

U.S. PATENT DOCUMENTS

| 3,188,242 | 6/1965 | Kordesch et al. | 429/36 |
| 3,998,689 | 12/1976 | Kitago et al. | 162/136 |
| 4,459,342 | 7/1984 | Shigeta et al. | 429/34 |
| 4,505,992 | 3/1985 | Dettling et al. | 429/36 |
| 4,506,028 | 3/1985 | Fukuda et al. | 429/40 |
| 4,522,895 | 6/1985 | Shigeta et al. | 429/34 |
| 4,547,418 | 10/1985 | Shigeta et al. | 429/40 |
| 4,579,789 | 4/1986 | Fukuda et al. | 429/44 |
| 4,580,337 | 4/1986 | Shigeta et al. | 29/623.1 |

FOREIGN PATENT DOCUMENTS 140668 12/1983 Japan .
2169273 7/1986 United Kingdom .

Primary Examiner—John E. Niebling
Assistant Examiner—Steven P. Marquis
Attorney, Agent, or Firm—Nixon & Vanderhye

[57] ABSTRACT

Disclosed herein are a carbonaceous composite product produced by joining carbonaceous materials together by melt-adhesion of a tetrafluoroethylene resin or a tetrafluoroethylene resin mixed with a highly electroconductive carbon black interposed between the carbonaceous materials, a composite electrode substrate for a fuel cell comprising the carbonaceous composite product and the process for producing the same.

11 Claims, 4 Drawing Sheets

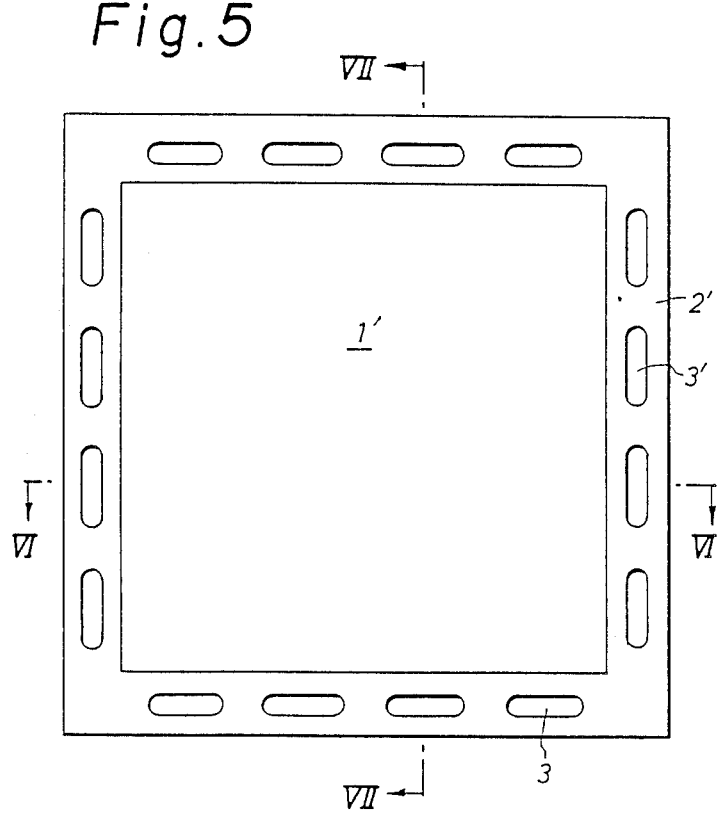
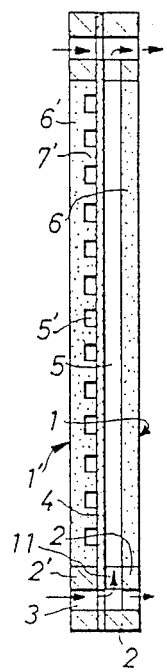
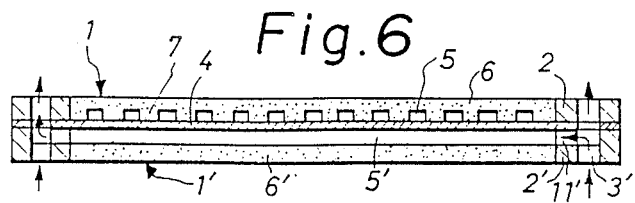

CARBONACEOUS COMPOSITE PRODUCT PRODUCED BY JOINING CARBONACEOUS MATERIALS TOGETHER BY TETRAFLUOROETHYLENE RESIN, AND PROCESS FOR PRODUCING THE SAME

BACKGROUND OF THE INVENTION

The present invention relates generally to a carbonaceous material (hereinafter referred to as "carbon material") and a composite product obtained therefrom, and particularly relates to the composite product comprising the carbon materials joined by the melt-adhesion of a tetrafluoroethylene resin or a tetrafluoroethylene resin mixed with a highly electroconductive carbon black interposed between the carbon materials, and the process for producing the composite carbon product.

Furthermore the present invention relates to a composite electrode substrate for a fuel cell of phosphoric acid type comprising the above-mentioned composite carbon product, wherein one of the two carbon materials is the extended part of the separator beyond the electrode of the above-mentioned composite electrode substrate and the other of the two carbon materials is a peripheral sealer, the peripheral sealer and a gas-distributor or a gas manifold, each of them being contact with the periphery of the electrode.

In recent years, carbonaceous products using carbonaceous materials such as carbon fiber, carbon particles as carbon aggregate, etc. have been used in various industrial fields, and higher requirements for the improvements of the productivity, the physical properties, etc. of the product have been largely raised with the technical progress and the increase of the demand for the carbonaceous products.

Although the carbon material is excellent in the physical properties as a raw material, for instance, heat-resistance, resistance to chemicals, electroconductivity, mechanical strength, etc., a development of carbonaceous composite materials which have been produced by joining the carbon materials of the same or different qualities in combination has been promoted for further making the most of these excellent physical properties. Such a carbonaceous composite material has been used hitherto as a composite product obtained by simply adhering the carbon materials by using an adhesive, however, there have been problems in resistance to chemicals, electroconductivity, dimensional stability, etc. thereof.

In recent years, a method for solving the above-mentioned problems has been conceived, wherein the carbon materials are joined together by using an adhesive and the thus composed materials are calcined to be one body.

However, in the case of producing the composite product by such a process, there are occasions where the carbon materials exfoliate on the joining surface thereof and cracks are caused in the product due to the difference of expansion and contraction rate between the carbon materials during the step of calcination, thus resulting in the reduction of the yield of production.

In addition, there is a high requirement for the development and utilization of a fuel cell and its circumferential system as the apparatus for generating a clean energy or a freely make and breakable electrogenerating apparatus which can contribute to the resource-economization by the levelling of the operation in steam-power generation or water-power generation or the improvement of the energy efficiency.

Hitherto, as fuel cells, the fuel cell of the bipolar type in which the bipolar separator obtained by rib-processing the gas-impermeable thin plate made of graphite is used after combining with a porous carbon flat plate has been publicly known, however, as compared with such a fuel cell, a development of a fuel cell of the monopolar type composed of stacking a porous electrode substrate.having ribs on one side thereof and the other flat side, a catalyst layer, a matrix impregnated with an electrolyte and a separator has been carried out. In such a fuel cell of the monopolar type, the reactant gas (oxygen or hydrogen) diffuses from the gas-flow channel formed by the ribs disposed on the electrode substrate to the flat surface of the electrode.

Although such an electrode substrate is made generally of the carbon material from the viewpoint of the physical properties such as heat-resistance, corrosion-resistance, electroconductivity, mechanical strength and the easiness of retaining porosity, etc. and is used after stacking as shown above, it is difficult to bring the flatness of the flat top part of the ribs to perfection and the electric and thermal contact resistance between the separator and the rib becomes too large to be not neglected. Generally, it has been generally said that the above-mentioned contact resistance is larger than the transmission resistance within the substrate by several times and causes the decisive demerits of the unevennes of the temperature distribution between the cells and the reduction of the generation efficiency.

As an object of solving such a problem of contact resistance, a composite electrode substrate produced by adhering the electrode substrate to the separator, etc. in the stack construction of the above-mentioned fuel cell and further calcining the thus adhered materials into one body as carbon has been proposed. Although in such a composite electrode substrate, the contact resistance which was present on the contact surfaces can be made zero by joining into one body, there are occasions, as has been stated, of exfoliation of the adhered surface of the carbon materials and of causing the cracks in the product due to the difference of expansion and contraction rates between the carbon material and the adhesive, because the electrode substrate is produced by joining the carbon materials together and further carbonizing and calcining the thus composed materials. Such occasions result in the reduction of the productive efficiency, and accordingly, the improvement thereof has been demanded.

As has been described above, to the carbonaceous composite material, very severe requirements of (1) not causing exfoliation of the carbon material therefrom at the time of producing and using the electrode substrate, (2) not causing the cracks in the product and also, (3) retaining the excellent specificities originally possessed by the carbon mateial, for instance, heat-resistance, resistance to chemicals, mechanical strength and electric specificities have been imposed, and therefore, the production of the carbonaceous composite material accompanies by an extraordinary difficulty.

As a result of the present inventors' studies on the process for joining the carbon materials together in the production of the carbonaceous composite material, it has been found by the present inventors that the carbonaceous composite material having desirable specifrcities can be produced with a favorable productivity by interposing a flexible graphite sheet between the carbon materials wherein the thus interposed graphite sheet acts as the buffer layer of the difference of the expansion and contraction rates of the carbon materials in the step of calcination. On the basis of their above-mentioned finding, the present inventors have filed a patent application (refer to U.S. patent application Ser. No. 812,724).

Further, as a result of the present inventors' studies from the conception that the difference of the expansion and contraction rates between the porous carbonaceous layer and the gas-impermeable layer (the separator) may be reduced or removed by a buffer layer interposed between the porous carbonaceous layer and the gas-impermeable layer (the separator) in the view point that the exfoliation occurring in the composite electrode substrate for a fuel cell in the step of calcination (up to the highest temperature of 3000° C.) is due to the difference of the thermal expansion rate between the porous carbonaceous layer and the gas-impermeable layer (the separator) in the temperature-raising step or to the difference of the thermal contraction rate between the above-mentioned two layers in the cooling step to room temperature after completing the calcination, it has been found by the present inventors that the inter-layer exfoliation which has been a problem can be improved by inserting a flexible carbon sheet, as a material for a buffer layer, which is relatively large in the rate of thermal expansion and contraction, has an adhesion to an adhesive, etc. and is not so permeable to gases, between the porous carbonaceous layer and the separator of the above-mentioned electrode substrate and joining the above-mentioned two layers via a carbonizable adhesive.

However, the substrate as the electrode in the fuel cell of phosphoric acid type in general is stacked so that one side thereof contacts to the matrix of phosphoric acid and the other side thereof faces to the separator.

In addition, on forming a fuel cell by stacking the electrode substrates, (1) a peripheral sealer or the peripheral sealer and a gas-distributor are disposed on the side of the electrode substrate parallel or parallel and perpendicular to the flow channels therein respectively to prevent the diffusion of the reactant gas from the side of the electrode to out side or (2) a manifold is disposed on the each side of the electrode for supplying the reactant gas to the fuel cell and at the same time, for preventing the diffusion of the reactant gas from the side of the electrode substrate to outside.

Accordingly, particularly in the case where the composite electrode substrate is formed of the porous and carbonaceous electrode up to the edge part thereof and the flow channels of the reactant gas opens directly at the edge part in the composite electrode substrate of the external manifold type, the peripheral sealer which is compact and carbonaceous and the electrode which is porous and carbonaceous are disposed opposite each other across the separator on the peripheral region of the separator, and there has been a problem of causing a certain degree of a warp or a strain in the joining part of the materials due to the difference of the thermal shrinkage between the materials even by the intervention of the flexible carbon sheet. As the means for preventing the above-mentioned warp, the materials with an extremely small difference of the thermal contraction rate should be selected, and such a restriction has been the obstruction in the production of the composite product.

In addition, as the other problems of the conventional electrode substrate for fuel cells, (1) there has been a possibility of causing exfoliation between the materials and leakage of the reactant gas through the joining part due to the poor resistance of the carbon cement used in joining the materials of the electrode substrate to phosphoric acid and (2) there has been a problem in the point of mechanical strength of the electrode substrate resulting in breaking on handling in the case where the area of the substrate is too large, because the electrode substrate is a thin plate.

Further, a method of joining the porous electroductive materials wherein the gas-impermeability between the porous electroconductive materials has been increased, has been proposed recently. According to the proposed method, the porous electroconductive material is impregnated with a fluorinated ethylene-propylene polymer, a polysulphone resin, etc., and the thus impregnated layer is joined as an interface to another electroconductive material by hot-ressing while maintaining electroconductivity through the gas impervious region (for instance, refer to U.S. Pat. No. 4,505,992).

However, in the case of using the above-mentioned methods, although the passage of the gas between the two carbon materials is prevented by the thus resin-impregnated carbon layer, since such a resin is low in melting viscosity, the usage of the thus obtained composite material impregnated with such a resin is limited.

As a result of the present inventors studies on the process which has overcome the above-mentioned defects of the conventional process and can join the carbon materials which have a large mechanical strength and can be used in an atmosphere at a temperature as high as about 350° C., it has been found by the present inventors that a composite product comprising the carbon materials, which is excellent in heat-resistance and resistance to chemicals and has an improved buffer action to the thermal expansion and adhesive strength, is obtained by joining the carbon materials together with the melt-adhesion of a tetrafluoroethylene resin interposed between the two carbon materials, and at the same time, a composite product which comprises the carbon materials, is excellent in resistance to chemicals and also has an electroconductivity is obtained by mixing a highly electroconductive carbon black with the tetrafluoroethylene resin, and on the basis of their above-mentioned findings, the present inventors have attained the present invention.

Namely, the first object of the present invention is to provide a composite product which comprises the carbon materials and has excellent physical properties, particularly the improved properties such as heat-resistance, resistance to chemicals and adhesive strength.

Furthermore, the second object of the present invention is to provide a process for producing a composite product comprising the carbon materials having the excellent physical properties and not having the demerits of the conventional techniques.

Still more, the third object of the present invention is to provide an electroconductive composite product comprising the carbon materials and having excellent physical properties, particularly the improved properties of heat-resistance, resistance to chemicals and adhesive strength.

In addition, the fourth object of the present invention is to provide a process for producing a carbonaceous and electroconductive composite product which has excellent physical properties and not having the demerit of the conventional technique.

Furthermore, the fifth object of the present invention is to provide a composite electrode substrate for a fuel cells, wherein the compact and carbonaceous peripheral sealer on the side of the electrode parallel to the flow channels of the reactant gas therein has been joined to the compact and carbonaceous separator and the composed materials have been formed to be one body.

Still more, the sixth object of the present invention is to provide a composite electrode substrate for a fuel cell, whereithe compact and carbonaceous peripheral sealer on the side of the electrode parallel to the flow channels of the reactant gas therein and the compact and carbonaceous gas-distributor on the side of the electrode perpendicular to the flow channels of the reactant gas therein have been joined to the compact and carbonaceous separator and the composed materials have been formed to be one body.

In addition, the seventh object of the present invention is to provide a composite electrode substrate for a fuel cell, wherein the compact and carbonaceous manifold provided with a flow passage for supplying the reactant gas has been joined to the compact and carbonaceous separator and the composed materials have been formed to be one body.

Finally, the eighth object of the present invention is to provide a composite electrode substrate for a fuel cell of phosphoric acid type, which is excellent in resistance to phosphoric acid.

The other objects and the merits of the present invention will be clear to the persons skilled in the art from the following description of the present invention.

SUMMARY OF THE PRESENT INVENTION

In a first aspect of the present invention, there is provided a composite product comprising carbon materials joined by melt-adhesion of a tetrafluoroethylene resin or a tetrafluoroethylene resin mixed with a highly electroconductive carbon black interposed between the carbon materials.

In a second aspect of the present invention, there is provided a process for producing a composite product which comprises carbon materials joined by melt-adhesion of a tetrafluoroethylene resin or a tetrafluoroethylene resin with a highly electroconductive carbon black interposed between the carbon materials, the process comprising interposing the tetrafluoroethylene resin or the tetrafluoroethylene resin mixed with the highly electroconductive carbon black between the carbon materials, and press-joining the thus composed materials by heating under a pressure, thereby producing the composite product.

In a third aspect of the present invention, there is provided a composite electrode substrate for a fuel cell, comprising a porous and carbonaceous electrode provided with flow channels of the reactant gas and joined to both surfaces of a separator via a flexible carbon sheet, and peripheral sealer on the side of said electrode parallel to said flow channels therein, which comprises a gas-impermeable and compact carbon material, the peripheral sealer on the side of the electrode parallel to the flow channels therein and a gas-distributor for distributing the reactant gas on the side of the electrode perpendicular to the flow channels therein, which comprises a gas-impervious and compact carbon material or a manifold which comprises a gas-impermeable and compact carbon plate and provided with a flow passage for supplying the reactant gas, said peripheral sealer, the peripheral sealer and the gas-distributor or the manifold being joined to the extended part of said separator beyond said electrode via a tetrafluoroethylene resin layer.

In fourth aspect of the present invention, there is provided a process for producing a composite electrode substrate for fuel cells comprising (1) joining a porous and carbonaceous electrode material provided with a flow channel of the reactant gas to a separator material by an adhesive while interposing a flexible carbon sheet between said electrode material and said separator material, (2) calcining further the thus joined materials at a temperature of not less than about 800° C. under a reduced pressure and/or in an inert atmosphere, thereby producing an electrode substrate part wherein said porous and carbonaceous electrode materials are joined to the both surfaces of said separator via said flexible carbon sheet, and (3) joining (a) a peripheral sealer on the side of said electrode parallel to said flow channels therein, which comprises a gas-impermeable carbon material, (b) said peripheral sealer on the side of said electrode parallel to said flow channels therein and a gas-distributor on the side of said electrode perpendicular to said flow channels therein, which comprises a gas-impermeable carbon material or (c) a manifold material comprising a gas-impermeable and compact carbon plate, to the extended part of said separator beyond said electrode via a sheet or a dispersion of a tetrafluoroethylene resin.

In a fifth aspect of the present invention, there is provided a composite electrode substrate for a fuel cell, comprising the compact and carbonaceous separator, the porous and carbonaceous electrodes provided with a plurality of grooves forming flow channels of the reactant gas, the electrode being joined to the both surfaces of the separator so that the flow channels in one of the electrodes are perpendicular to those in the another electrode, ribs forming the grooves of electrode and the separator being joined together via the flexible carbon sheet disposed on joining surfaces of the ribs, and a pair of the peripheral sealers on the side of the electrode parallel to the flow channels therein, which comprises gas-impervious and compact carbon material being joined to the extended part of the separator beyond the electrode via the tetrafluoroethylene resin layer.

In a sixth aspect of the present invention, there is provided a process for producing an electrode substrate for a fuel cell, which process comprises (1) adhering the flexible carbon sheet onto one surface of a porous and carbonaceous electrode material of a flat plate-form without grooves and of the prescribed dimensions by the adhesive, (2) providing grooves of the desired dimension for forming the flow channels of the reactant gas on the joining surface side by cut-processing, (3) joining the separator material to the surface of the flexible carbon sheet remaining on the thus cut-processed surface of the electrode material in face to face, (4) calcining the thus composed materials at a temperature of not lower than about 800° C. under a reduced pressure and/or in an inert atmosphere and (5) joining the peripheral sealer on the side of the electrode parallel to the flow channels therein, which comprises a gas-impervious and compact carbon material to the extended part of the separator beyond the electrode via a sheet or a dispersion of the tetrafluoroethylene resin.

In a seventh aspect of the present invention, there is provided a composite electrode substrate for a fuel cell, comprising the compact and carbonaceous separator, the porous and carbonaceous electrodes provided a plurality of grooves forming said flow channels of the reactant gas on one side thereof and one flat surface on the another side, the electrode being joined to the both surfaces of said separator via said flexible carbon sheet so that said flow channels of the reactant gas in one of said electrodes are perpendicular to those in another said electrode, and a pair of peripheral sealers on the side of the electrode parallel to the flow channels therein, which comprises a gas-impervious and compact carbon material and a pair of gas-distributors on the side of the electrode perpendicular to the flow channels therein, which comprises a gas-impervious and compact carbon material, the peripheral sealers and the gas-distributors being joined to the extended part of said separator beyond said electrode via said tetrafluoroethylene resin layer.

In an eighth aspect of the present invention, there is provided a process for producing a composite electrode substrate for a fuel cell, which process comprises (1) adhering said flexible carbon sheet onto one surface of the electrode material of the prescribed dimension and of a flat plate-form without grooves by the adhesive, (2) providing the groove of the desired dimension for forming the flow channel of the reactant gas on the joining surface side of the electrode material, (3) joining the separator material to the surface of the flexible carbon sheet remaining on the thus cut-processed surface of the electrode material in face to face, and (4) calcining the above composed materials at a temperature of not lower than about 800° C. under a reduced pressure and/or in an inert atmosphere thereby producing a electrode substrate part and (5) joining a pair of peripheral sealers comprising gas-impervious and compact carbon material on the side of said electrode parallel to said flow channels therein and a pair of gas-distributors comprising gas-impervious and compact carbon material on the side of said electrode perpendicular to said flow channels therein, to the extended part of said separator beyond said electrode via a sheet or a dispersion of tetrafluoroethylene resin.

BRIEF EXPLANATION OF THE DRAWINGS

Of the attached drawings,

FIG. 5 is a ground plan of the composite electrode substrate provided with the manifold for a fuel cell according to the present invention, FIGS. 6 and 7 are respectively the cross sectional views of VI—VI and VII—VII of FIG. 5

DETAILED DESCRIPTION OF THE INVENTION

Figure 1:
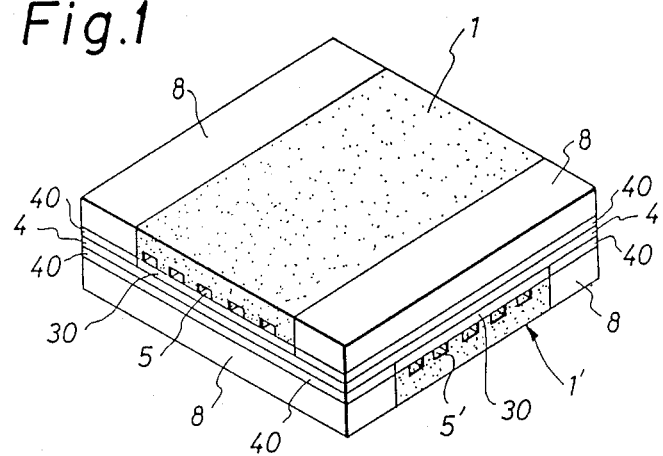
FIGS. 1 and 2 are the respective oblique views of one and another examples of the composite electrode substrate provided with the peripheral sealer for a fuel cell according to the present invention.

The present invention generally relates to a carbonaceous material, a composite product obtained therefrom and a process for producing thereof, and particularly relates to a composite product comprising the carbonaceous materials joined together by melt-adhesion of a tetrafluoroethylene resin or a tetrafluoroethylene resin mixed with a highly electroconductive carbon black and a process for producing the composite product.

Furthermore, the present invention relates to a composite electrode substrate for a fuel cell wherein the carbon materials have been joined together by the melt-adhesion of the above-mentioned tetrafluoroethylene resin (hereinafter referred to as TFE resin)and particularly, to a composite electrode substrate wherein the peripheral sealer, the peripheral sealer and the gas-distributor or the manifold has (have) been joined to the extended part of the compact and carbonaceous separator beyond the electrode via a layer of the TFE resin and each of the above-mentioned material comprise a gas-impermeable and compact carbon material.

The object of the present invention is attained by joining the carbon materials while interposing a sheet of a TFE resin or a dispersion of a TFE resin mixed with a highly electroconductive carbon black between the carbon materials.

The fluorocarbon resin used according to the present invention is tetrafluoroethylene resin, preferably. For instance, as TFE resins used in the present invention, a TFE resin of a melting point of 327° C. and the thermal deforming temperature of 121° C. under a pressure of 4.6 kgf/cm$^2$G may be mentioned. These TFE resins are commercialized, for instance, as the resin having the trade name of TEFLON ®.

According to the present invention, the TFE resin is used as a sheet of a thickness of about 50 μm or a dispersion containing 60% by weight thereof. Into the above-mentioned dispersion, a small amount of a surfactant may be added.

In the case of producing an electroconductive composite product according to the present invention, a highly electroconductive carbon black is mixed with the above-mentioned dispersion of a TFE resin and the thus obtained dispersion is used. As the highly electroconductive carbon black, for instance, VULCAN XC-72R manufactured by Cabot Corp., KETJENBLACK EC manufactured by Lion Akzo Co. Ltd, etc. may be mentioned, and it may be selected from those commercialized. In the case of the above-mentioned mixing, the mixing ratio by weight of the TFE resin and the carbon black is from 1:9 to 9:1. For mixing the highly electroconductive carbon black with the dispersion of a TFE resin, although the two components may be mixed by stirring, it is preferable to use the stirring by supersonic waves.

As the carbon materials joined together according to the present invention those having each a bulk density of not less than 1.40 g/cc are preferable. From the viewpoint of the physical property, they may be the same or different in quality, however, in the case where they are different from each other, it is preferable that the difference of the thermal expansion coefficient between them is not more than $2 \times 10^{-6}$/°C. In addition, it is preferable that the shrinkage of these materials in the case of calcining them at 2000° C. under a reduced pressure and/or in an inert atmosphere is not more than 0.2%.

As the example of the carbon material (the raw material) used according to the present invention, the following materials may be mentioned, however, the carbon material used in the present invention is not restricted thereto:

(1) a molded carbon material comprising a binder and a carbon aggregate selected from the group consisting of carbon fibers, carbon particles and oxidized pitch particles. As the binder, various materials may be used, and for instance, one material or two or more combined materials selected from the group consisting of phenol resins, furan resins, epoxy resins or pitches of petroleum series or coal series are used.

(2) a carbon material obtained by calcining the molded carbon material of the above (1) at a temperature of not lower than 800° C. under a reduced pressure and/or in an inert atmosphere, (3) a molded carbon material comprising a graphite aggregate which is graphite particle and/or easily graphitizable carbon particle and a binder, for instance, pitch of coal- or petroleum series, phenol resin, furan resin and epoxy resin, (4) a carbon material obtained by calcining the molded carbon material of the above (3) at a temperature of not lower than 800° C. under a reduced pressure and/or in an inert atmosphere and (5) a composite carbon material obtained by joining the carbon materials in the above (1) to (4) together and further calcined the thus composed materials to be one body under a reduced pressure and/or in an inert atmosphere.

According to the present invention, the above-mentioned carbon materials are used in an optional combination.

In the production of the composite material according to the present invention, for the above-mentioned carbon materials together by the melt-adhesion of the TFE resin, the TFE resin is interposed between the carbon materials and the thus composed materials are press-joined by heating under a pressure. For instance, in the case of using a sheet-form TFE resin, it is inserted between the two carbon materials and the thus composed materials are press-joined by heating under a pressure, and in the case of using a dispersion of a TFE resin or a dispersion of a TFE resin mixed with a highly electroconductive carbon black, the each dispersion is applied onto the joining surfaces of the carbon materials and after drying the thus applied dispersion and piling the thus treated materials, the obtained composed carbon materials are press-joined by heating under a pressure.

The temperature of heating in the above-mentioned cases is not lower than the temperature which is lower than the melting point of the TFE resin by 50° C., and the pressure in such a process is not less than 1 kgf/cm$^2$G. In the case where the joining pressure is lower than the above, the temperature is preferably not lower than the melting point of the TFE resin and on the other hand, in the case where the joining pressure is higher than 1 kgf/cm$^2$G, the junction thereof can be accomplished even at a temperature of not higher than the melting point of the TFE resin. The predetermined pressure is retained for not less than 10 sec after the TFE resin is heated to the predetermined joining-temperature. Thereafter, the thus heated composed material is released to ordinary pressure or cooled to room temperature while holding the predetermined pressure.

The composite product obtained according to the present invention shows the excellent specificities originally possessed by the carbon material(s), and at the same time, the TFE resin acts as a buffer material of the difference of thermal expansion and contraction rate between the carbon materials in the temperature range of, for instance, 150° to 350° C., and accordingly, there is no occasion of causing exfoliation of the raw material (the carbon material) on the joining surface thereof at the time of producing the composite product and of causing cracks in the product, thus resulting in the effect of being able to produce the composite product in a favorable production yield. Particularly, the effect of the present invention shown above will be clear in comparison to the case where the carbon materials is joined together by only using an adhesive.

In addition, the composite product according to the present invention is excellent in resistance to chemicals because of the use of the TFE resin. Since the adhesive commonly used in joining the carbon materials together is podr in resistance to chemicals, there is a fear of exfoliation from the joining surface when such a composite product is used in an environment wherein the product is exposed to chemical(s).

Furthermore, in the case where a highly electroconductive carbon black has been mixed with the adhesive layer of the TFE resin according to the present invention, the elecroconductivity is retained even in the joining surface and the adhesive layer. In addition, the highly electroconductive carbon black itself is resistant to chemicals and accordingly the resistance to chemicals of the joining part is also retained.

Although the usually used adhesive can be used only at a temperature of not higher than about 160° C., the compact product comprising the carbon material according to the present invention can be used even at a high temperature in the vicinity of the melting point of the TFE resin used therein. In this connection, in the case where the operations of heating the composite product according to the present invention to a temperature of not lower than the melting temperature of the TFE resin and then cooling thereof was repeated several times, no exfoliation of the carbon material occurred.

In addition, the composite product according to the present invention has a high adhesive strength of not less than, for instance, 90 kgf/cm$^2$ because of the intervention of the TFE resin. Hitherto, the adhesive strength of the carbonaceous composite product in which a flexible graphite sheet was interposed between the carbon materials (in the prior U.S. patent application No. 812724 filed by the present applicant) was, for instance, 2 to 3 kgf/cm$^2$.

Hitherto, in the case of using a carbonaceous composite material in a chemical at a high temperature, it was necessary to, for instance, calcine the composed materials at a high temperature to be wholly carbonized in order to confer the resistance to chemicals and the electroductity on the product. In such a case, in order to prevent the occurrence of exfoliation on the joining surface of the carbon materials and of cracks in the product due to the calcination at the high temperature, he present applicant joined the carbon materials by using a flexible graphite sheet as a stress relaxation material.

However, in the present invention wherein the carbon materials are joined by using the carbon materials and a TFE resin or a TFE resin mixed with a highly electroconductive carbon black, since the joining temperature may be lowered differing from the conventional case, the absolute value of the thermal expansion of each of the materials jointed becomes smaller and it becomes possible to join the materials of different quality having the large difference of the thermal expansion coefficient between the materials. In addition, there is no necessity of calcining the composed materials and accordingly, the energy cost and the installation cost for production thereof can be largely economized.

Furthermore, the joining part of the composite product according to the present invention is excellent in the gas-impermeability, and in the case of representing the gas-impermeability by the amount of gas-leakage through the peripheral length of the joining part per unit time under a definite differential pressure [(the amount of gas-leakage)/(length of the side)·(differential pressure)], the amount was $3 \times 10^{-6}$ ml/cm·hour·mmAq in the case of Example 1 and $2 \times 10^4$ ml/cm·hour·mmAq in the case of Example 2.

Since the composite product consisting mainly of the carbon materials is particularly excellent in the resistance to chemicals and heat, as has been described above, it is particularly suitable as the carbonaceous composite product such as the electrode for the electrochemical cell used in the environment wherein such a product is exposed to chemical(s) at a high temperature.

In the next place, the composite electrode substrate according to the present invention will be explained by the attached drawing as follows.

In the composite electrode substrate according to the present invention, the two electrode thereof have been preferably joined to the both surfaces of the separator so that the flow channels of the reactant gas in one of the electrodes are perpendicular to those in the another electrode, as are shown in FIGS. 1 to 8 of the attached drawing.

Figure 2:
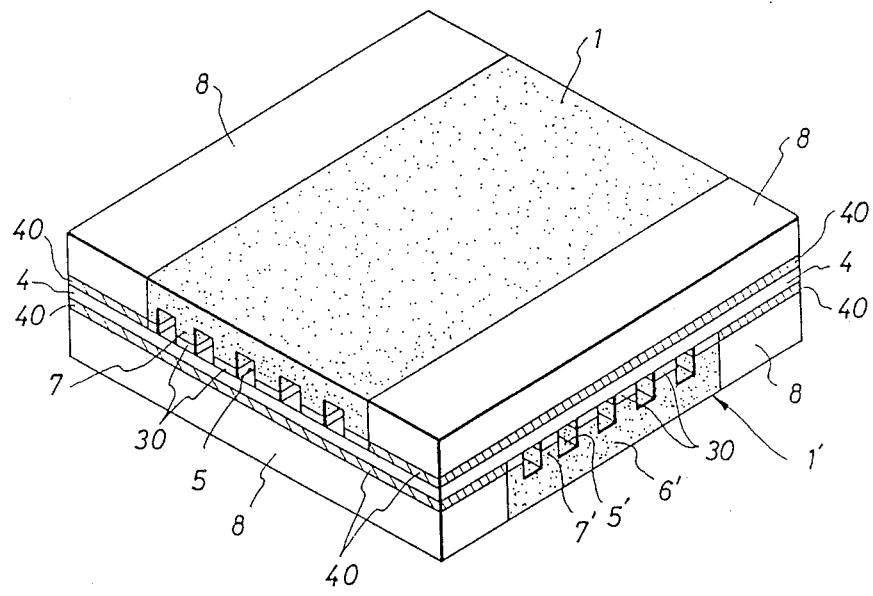

FIGS. 1 and 2 are the oblique view of the composite electrode substrate provided with the peripheral sealer according to the present invention. The composite electrode substrate of FIGS. 1 and 2 has a construction comprising the two electrodes 1, 1' having flow channels 5, 5' of the reactant gas and the ribs 7, 7' the separator 4 interposed between the two electrodes and the peripheral sealers 8 on the side of the electrode parallel to the flow channels 5, 5' of the reactant gas in the above-mentioned electrode.

The separator 4 is larger in a surface area than the electrodes 1, 1', and as has been shown in FIGS. 1 and 2, the separator has been extended beyond the periphery of the electrode parallel to the flow channel 5 or 5' in one of the electrode (the outer edge of the extended part being coincided with the outer edge of the another electrode), and the peripheral sealer 8 has been joined to the extended part via a TFE resin. Between the separator 4 and the electrodes 1, 1' a flexible carbon sheet 30 has been inserted, and the peripheral part (extended part) of the separator and the peripheral sealer 8 have been joined together via a TFE resin 40.

In the composite electrode substrate shown in FIG. 1, the flow channel 5 of the reactant gas has been formed by the rib 7 of the electrode 1 and the flexible carbon sheet 30 (namely, the area of the flexible carbon sheet 30 equals to the area of the electrode 1), however, in the composite electrode substrate shown in FIG. 2, the flow channel 5 of the reactant gas has been formed by the rib 7 of the electrode 1, the separator 4 and the flexible carbon sheet 30 (namely, the flexible carbon sheet 30 is disposed only between a top of the rib 7 and the separator 4).

Figure 3:
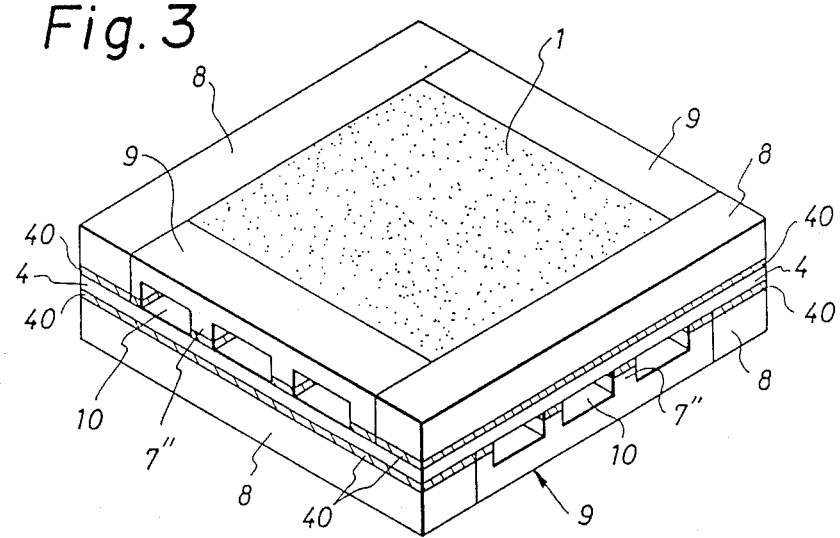
FIGS. 3 and 4 are the respective views of the composite electrode substrates provided respectively with the gas-distributor and the peripheral sealer for a fuel cell accoding to the present invention.

FIG. 3 is the oblique view of the composite electrode substrate provided with the gas-distributor which has the grooves forming the flow passage for distributing the reactant gas and the peripheral sealer according to the present invention.

Figure 4:
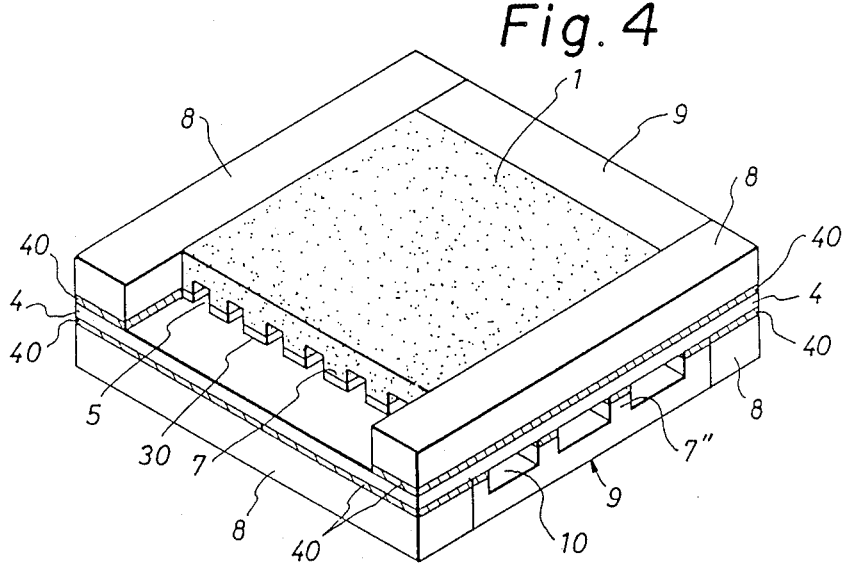

FIG. 4 shows the situation of the same composite electrode substrate deprived of the gas-distributor 9 which has the rib 7" forming the flow passage 10 and the TFE resin 40 which adhered to the gas-distributor 9.

In FIGS. 3 and 4, the composite electrode substrate has a construction comprising the separator 4, the two electrodes 1, 1' which have grooves forming the flow channels 5, 5' of the reactant gas together with the separator 4 and are disposed so that the above-mentioned flow channels 5, 5' of the reactant gas are perpendicular to each other on the both surfaces of the separator 4, the peripheral sealer 8 disposed on the side (periphery) of the electrode parallel to the flow channel 5 (or 5')and the gas distributor 9 disposed on the side (periphery) of the electrode perpendicular to the flow channel 5 (or 5').

The separator 4 is larger in a surface area than the electrode 1, 1' and, as is seen in the FIGS. 3 and 4, has been extended beyond the periphery of the electrode, and the peripheral sealer 8 and the gas-distributor 9 have been joined to the extended part (the outer edge of the extended part of the separator coincides with the outer edge of the peripheral sealer and the gas-distributor after joining).

The gas-distributor 9 which is joined to the extended part beyond the periphery of the electrode perpendicular to the flow channel 5 of the reactant gas has the groove while forming the flow passage 10 by the rib 7' and the separator, and the peripheral sealer which is joined to the extended part beyond the periphery of the electrode parallel to the flow channel of the reactant gas does not have the above-mentioned rib Although the rib 7" of the gas-distributor 9 forms the flow passage 10 for distributing the reactant gas from outside to the flow channel 5 of the reactant gas, it is not necessary that the cross-section of the flow passage 10 particularly coincides with the cross-section of the flow channel 5 in shape and size and moreover, it is not necessary that all the openings of the flow channel 5 of the reactant gas open to the flow passage 10. Namely, the sectional shape of the flow passage may be decided so that the necessary amount of the gas flow is maintained in the case where the composite product is used as an electrode substrate for a fuel cell.

Between the separator 4 and the rib 7, a flexible carbon sheet 30 has been inserted. In addition, in the FIGS. 2 to 4, the flexible carbon sheet 30 is inserted only between the joining surfaces of the separator 4 and the rib 7, and accordingly, the flow channel 5 of the reactant gas is prescribed by the groove of the electrode, the separator and the flexible carbon sheet, and furthermore, the flow passage 10 has a form prescribed by the groove of the gas-distributor, the separator and the TFE resin. For convenience's sake of production, the flexible carbon sheet 30 has the same size as that of the electrode and may be joined to the whole surface of the separator facing to the electrode. Namely, the such shape and dimension of the flexible carbon sheet is in the scope of the present invention.

However, from the view point concerning the thickness of the composite electrode substrate, the structure in FIG. 2 to FIG. 4 is more preferable to that shown in FIG. 1, because the thickness of the composite electrode substrate of structure shown in FIGS. 2 to 4 can be smaller than that of the structure shown in FIG. 1 by the thickness of the flexible carbon sheet while the structure in FIGS. 2 to 4 maintains the same cross-sectional area of the flow channel of the reactant gas as that shown in FIG. 1.

In FIGS. 3 and 4, the peripheral part (extended part) of the separator beyond the electrode, the peripheral sealer 8 and the gas-distributor 9 have been respectively joined via the TFE resin 40. Although the TFE resin may be interposed between the joining surface of the peripheral sealer and the gas-distributor both of which are joined to the same side of the separator, it is not particularly necessary, because the gas-leakage does not become any problem in the case where the product is used in combination with the outer manifold which is made so as to cover the above-mentioned joining part.

FIG. 5 is the plane figure of the composite electrode substrate provided with the manifold according to the present invention and FIGS. 6 and 7 are respectively the cross-sectional views in VI to VI and VII to VII of FIG. 5.

The composite electrode substrate provided with the manifold according to the present invention has a construction comprising the two electrodes 1, 1' having the flow channels 5, 5' of the reactant gas, the separator 4 located between the two electrodes 1, 1' and the manifolds 2, 2' adjacent to the periphery of the electrode.

The separator 4 is larger in a surface area than the electrodes 1, 1', and as is shown in FIG. 5, the separator has been extended beyond the periphery of the electrodes 1, 1', and the manifolds 2, 2' are joined to the thus extended part. A flexible carbon sheet 30 has been interposed between the separator and the electrode, and the peripheral part (extended part) of the separator which has been extended beyond the electrode, and the manifold have been joined together via the TFE resin 40 (refer to FIGS. 9a-9d).

Moreover, in the manifold part 2, a flow passage 3 for supplying the reactant gas is provided while penetrating the separator 4 and the manifold 2. The flow passage 3 for supplying the reactant gas is (1) connected to the flow channel 5 of the reactant gas provided in the electrode 1 comprising the gas diffusion part 6 and rib 7 via a flow passage 11 of the reactant gas provided in the manifold 2 or (2) connected directly to the flow channel 5 of the reactant gas provided in the electroe 1, and the another electrode 1' is sealed by the manifold 2' (refer to FIG. 7).

In FIG. 6, the flow passage 3' for supplying the reactant gas is (1) connected to the flow channel 5' of the reactant gas provided in the electrode 1' via a flow passage 11' of the reactant gas provided in the manifold 2' or (2) connected directly to the flow channel 5' of the reactant gas provided in the electrode 1', and the another electrode 1 is sealed by the manifold 2.

The flow direction of the reactant gas is shown by the arrow marks in FIGS. 6 and 7.

The flow channel 5 of the reactant gas has been prescribed by the gas-diffusion part 6 and the rib 7 in the electrode 1 and the separator 4 or the flexible carbon sheet (refer to 30 in FIG. 9a-9d) which has been joined to the separator 4.

There are many modifications concerning the internal structure of the manifold, and some examples of such modifications are shown.

FIGS. 8a through 8d and FIGS. 9a through 9d, which respectively show plan and cross sectional elevational views thereof.

Figure 9A:
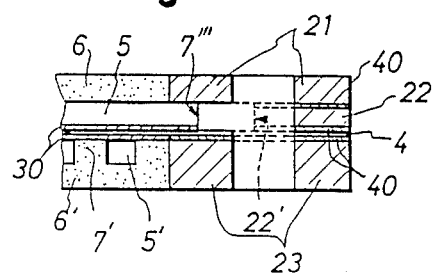
FIGS. 9a through 9d show cross sectional views of the manifolds shown in FIGS. 8a through 8d as taken along lines 9a-9a through 9d-9d, respectively.
Figure 8A:
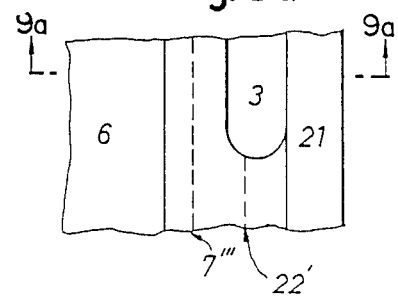
FIG. 8a through 8d show partial plan view of the manifolds according to the present invention.

FIGS. 8a and 9a show the construction wherein the manifold has been divided into three parts 21, 22 and 23, and the rib 7 of one of the electrodes has a construction of entering a little (for instance, to 7''') under the manifold part 21. In addition, the internal edge of the manifold 22 is shown by 22'. The two parts 21 and 22 of manifold, 22 and the separator 4 and 23 and the separator 4 are mutually are joined via the TFE resin as shown by 40 in FIGS. 8a and 9a respectively.

Figure 9B:
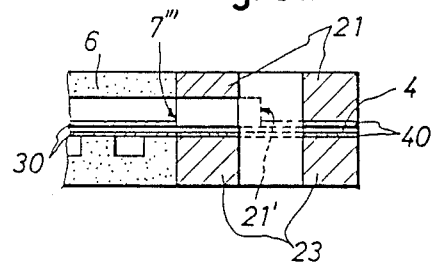
Figure 8B:
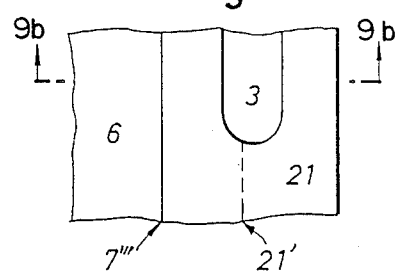
Figure 9C:
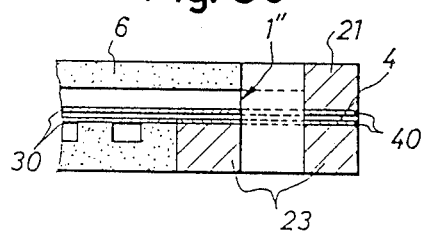
Figure 8C:
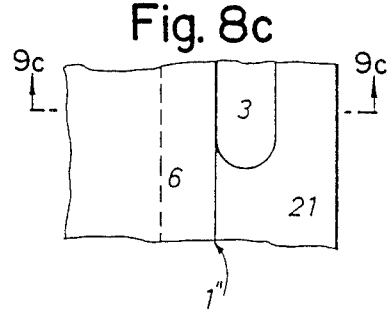
Figure 9D:
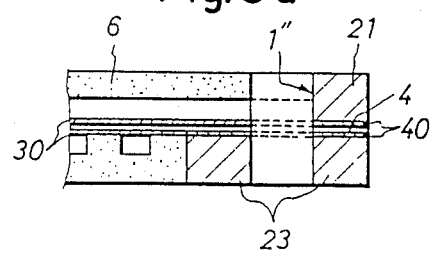
Figure 8D:
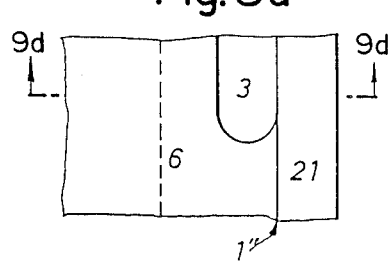

In FIGS. 8b and 9b show the situation wherein the manifolded parts 21 and 22 of FIGS. 8a and 9a have been formed into one body and the manifold consists of the two parts 21 and 23, and the rib 7 ends in the same plane 7''' as the edge surface of the gas-diffusion part 6. In addition, the surface corresponding to the inner edge 22' of FIGS. 8a and 9a is shown by 21' in FIGS. 8b and 9b.

In FIGS. 8c and 9c and FIGS. 8d and 9d show the structure wherein one of the electrodes has been extended to either end (shown by 1'') of the flow passage 3 for supplying the reactant gas and contacts to the inner edge of the maniold part 21.

In every case, the manifold and the separator have been joined via the TFE resin inserted therebetween. In addition, the structures shown in FIGS. 8a through 8d, and 9a through 9d indicate respectively only one example, and the internal structure of the manifold may take various modes different from those shown in FIGS. 8a through 8d, and 9a through 9d.

In the next place, each of the materials used for producing the composite electrode substrate for a fuel cell according to the present invention will be explained in detail as follows.

The electrode used for producing the composite electrode substrate according to the present invention comprises a porous and carbonaceous material which preferably shows the following properties after being calcined at a temperature of not lower than 800° C. under a reduced pressure and/or in an inert atmosphere:

Mean bulk density of 0.3 to 0.9 g/cc,
Gas-permeability of not less than 200 ml/cm$^2$·hour·mmAq,
Electric resistance of not more than 200 m$\Omega$19 cm As the material for the electrode of the composite electrode substrate according to the present invention, the following materials are used.

(1) a material prepared by molding a mixture of short carbon fibers, a binder and an organic granular substance at a high temperature under a pressure (refer to Japanese Patent Application Laid-Open No. 59-68170 (1984)). Particularly the material obtained by molding a mixture comprising 20 to 60% by weight of short carbon fibers of not more than 2 mm in length, 20 to 50% by weight of a phenol resin and 20 to 50% by weight of an organic granular substance (a micropore regulator) under the conditions of the molding temperature of 100° to 180° C., the molding pressure of 2 to 100 kgf/cm$^2$G and the pressure holding time of 1 to 60 min.

(2) a material prepared by calcining the molded material of the above (1) at a temperature of not lower than 800° C. under a reduced pressure and/or in an inert atmosphere.

Furthermore, as the material of the electrode of the composite electrode substrate shown in FIG. 1 and FIGS. 5 to 8 (namely, the electrode material provided with the rib before joining the flexible carbon sheet thereto), the following materials are used:

(3) a molded product comprising the gas-diffusion part formed of a paper sheet (for instance, refer to Japanese Patent Publication No. 53-18603 (1978)) prepared by impregnating a paper sheet manufactured from a mixture of carbon fiber of not more than 20 mm in length, at least one kind of organic fiber selected from pulp, regenerated cellulose fibers and polyacrylonitrile fibers, etc. and a paper-manufacturing binder (polyvinyl alcohol fiber, etc.) by paper-manufacturing process with a solution of a phenol resin and the rib formed by using the material of the above mentioned (1), and (4) a product obtained by calcining the molded product of the above-mentioned (3) at a temperature of not lower than 800° C. under a reduced pressure and/or in an inert atmosphere.

The compact and carbonaceous separator used in the composite electrode substrate according to the present invention comprises preferably the material of the following properties:

Mean bulk density of not less than 1.40 g/cc,
Gas-permeability of not more than $10^{-6}$ ml/cm$^2$·hour·mmAq,
Electric resistance of not more than 10 mΩ·cm and the thickness of the material is preferably not more than 2 mm.

Furthermore, as the material of the separator, a compact carbon plate of the calcining shrinkage of not more than 0.2% in the case of calcining thereof at 2000° C. is preferable.

In addition, the separator is generally plate-form and the area of one side thereof is larger than the area of one side of the electrode, however, at the stage, as will be described later, wherein the separator material and the electrode material are joined together, the area of the former may be the same as that of the latter.

The material of the peripheral sealer, the gas-distributor and the manifold used in the composite electrode substrate according to the present invention is preferably the compact carbon material of the following properties:

Mean bulk density of not less than 1.40 g/cc,
Gas-permeability of not more than $10^{-4}$ ml/cm$^2$·hour·mmAq and
Difference of the thermal expansion coefficient thereof from that of the material of the separator is not more than $2 \times 10^{-6}$/°C.

Particularly, the above-mentioned material is preferably a material subjected to calcination at a temperature of not lower than 800° C. under a reduced pressure and/or in an inert atmosphere.

In addition, the material of the peripheral sealer, the gas-distributor and the manifold is preferably the compact carbon material such that the shrinkage on calcination thereof is not more than 0.2% after being calcined at 2000° C.

As has been described above, since all the peripheral sealer, the gas-distributor and the manifold having the above-mentioned physical properties have been joined to the separator via the TFE resin, the amount of gas-leakage through the peripheral sealer, the gas-distributor and the manifold including the joining parts thereof is mainly subject to gas diffusion and is not so much influenced by the pressure of the reactant gas. However, in the case where the amount of gas-leakage under the differential pressure of 500 mmAq. is length of the joining part per unit time, namely [amount of gas-leakage/(side length of the periphery)·(differential pressure)] the amount is preferably not more than $10^{-2}$ ml/cm·hour·mmAq.

In the production of the composite electrode substrate according to the present invention, the TFE resin used in joining the peripheral sealer, the gas-distributor and the manifold to the extended part of the separator is the same as that used in joining the above-mentioned carbon materials in general to each other.

In the production of the composite electrode substrate according to the present invention, the above-mentioned TFE resin is used as a sheet of about 50 μm in thickness or a dispersion containing about 60% by weight of the TFE resin. A small amount of a surfactant may be added to the above-mentioned dispersion.

In addition, the afore-mentioned dispersion of the TFE resin mixed with the above-mentioned highly electroconductive carbon black may be used.

As the flexible carbon sheet used for joining the electrode and the separator in the composite electrode substrate according to the present invention, a flexible graphite sheet of not more than 1 mm in thickness which has been prepared by compressing the expanded graphite particles obtained by subjecting graphite particles of not more than 5 mm in diameter to acid-treatment and further heating the thus acid-treated particles, shows a bulk density of 1.0 to 1.5 g/cc and a rate of compression strain (namely, the rate of strain to the compression load of 1 kgf/cm$^2$) of not more than $0.35 \times 10^{-2}$ cm$^2$/kgf and has a flexibility that the sheet is not broken in the case of bending the sheet to 20 mm in the radius of curvature is preferable, and of the commeriallied flexible graphite sheets, GRAFOIL® made by U.C.C. is a suitable example.

The flexible carbon sheet used also according to the present invention is produced by mixing carbon fibers of not less than 1 mm in the mean length with a binder of not less than 10% in the carbon yield, for instance, pouring the above binder into the matrix of the above carbon fibers, molding the thus composite materials by heating under a pressure and calcining the thus molded material at a temperature of not lower than 850° C. under a reduced pressure and/or in an inert atmosphere. The thus produced flexible carbon sheet has a thickness of not more than 1 mm, a bulk density of 0.2 to 1.3 g/cc and a rate of compression strain of not more than $2.0 \times 10^{-1}$ cm$^2$/kgf, wherein the carbon lumps derived from the above-mentioned binder have been dispersed in the matrix of the carbon fibers and restrain a plurality of the carbon fibers and the carbon fibers have been joined to the above-mentioned carbon lumps so as to freely slide through the carbon lump. The just-mentioned flexible carbon sheet has a flexibility of not being broken in the case of bending the sheet to 10 mm in the radius of curvature.

As the adhesive used on each of the joining surfaces in the case of joining the above-mentioned electrode material to the separator material via the flexible carbon sheet, an adhesive used generally in joining the carbon materials to each other may be used, however, it is preferable to use for that purpose a thermosetting resin selected particularly from phenol resins, epoxy resins, furan resins, etc.

Although the thickness of the layer of the adhesive is not particularly restricted, it is preferable to apply the adhesive in the thickness of generally not more than 0.5 mm uniformly.

The junction of the electrode material and the separator material by the above-mentioned adhesive can be carried out at a temperature of 100° to 180° C. under a press pressure of 1 to 50 kgf/cm$^2$G. for a press time of 1 to 120 mm.

The joining of the electrode part and the separator of the composite electrode substrate according to the present invention shown in FIG. 1 and FIGS. 5 to 8 is carried out by after providing the grooves forming the flow channels of the reactant gas in the electrode material, joining each of the electrode materials on the both surfaces of the separator via the flexible carbon sheet preferably so that the flow channels of the reactant gas in one of the electrodes are perpendicular to those in the another electrode and calcining the thus composed materials at a temperature of not lower than 800° C. under a reduced pressure and/or in an inert atmosphere.

Furthermore, the joining of the electrode material and the separator material in the composite electrode substrate shown in FIGS. 2 to 4 and the formation of the grooves can be effected as follows.

After adhering the flexible carbon sheet to the plate-form electrode material while using the above-mentioned adhesive and the adhering conditions, the surface of the sheet adhered to the electrode material is cut-processed in order to make the groove of prescribed dimension for forming the flow channel of the reactant gas in the electrode. Such a cut-processing can be effected by an optional means, for instance, it is carried out by using a diamond blade.

On the surface of the flexible carbon sheet still remaining on the two electrode materials after cut-processing, the adhesive is applied, and the thus treated two electrode materials are joined respectively to the both surfaces of the separator by the same method as that in joining the electrode material and the flexible carbon sheet so that the flow channels of the reactant gas in one of the electrodes are perpendicular to those in the another electrode. Then, the thus composed materials are calcined at a temperature of not lower than about 800° C. under a reduced pressure and/or in an inert atmosphere. In addition, the carbonization of the thus composed materials can be also secured by carrying out the calcination of the composed materials under the same conditions as those of calcining the each material before the above-mentioned cut-processing, namely by carrying out the calcination two times.

After joining the electrode material and the separator material together and calcining the thus joined materials, in the case where the electrode and the separator are of the same dimension (namely, the extended part of the separator beyond the electrode is not provided thereupon), the parts of the electrode material and the flexible carbon sheet facing to the extended part of the separator to be joined later are removed by cutting, thereby exposing the joining surface (the extended part beyond the electrode) of the separator to be joined to the peripheral sealer, the gas-distributor and the manifold. Then, a sheet (or a dispersion) of the TFE resin is inserted between (or applied onto the surfaces of) the thus exposed or previously provided extended part of the separator and the surface of the peripheral sealer, the gas-distributor and the manifold, and the thus composed materials are press-joined by heating under a pressure of not less than 1 kgf/cm$^2$G. and at a temperature of not lower than the temperature which is lower than the melting point of the TFE resin by 50° C., for a time of not less than 10 sec.

In addition, in the case of producing the composite electrode substrate shown in FIGS. 1 to 4, a pair of peripheral sealers not having the groove forming the flow channel of the reactant gas are joined to the extended part of the above-mentioned separator while being adjacent to the periphery of the electrode which is parallel to the flow channel of the reactant gas, via the layer of the TFE resin as has been said above.

In the case of producing the composite electrode substrate shown in FIGS. 3 and 4, in addition to the above-mentioned, the gas-distributor provided with the groove forming the flow passage for distributing the reactant gas disposed on the periphery (side) perpendicular to the flow channels of the reactant gas in the above-mentioned electrode is joined to the extended part of the separator via a layer of a TFE resin as has been described above.

The groove of the gas-distributor shown in FIGS. 3 and 4 may be preliminarily provided by cut-processing in the desired size by an optional means in the same manner as in the case of the electrode comprising a porous carbon material.

In addition, the TFE resin may be preliminarily melt-adhered to the peripheral sealer and the gas-distributor.

Still more, in order to obtain the structure of the electrode shown in FIGS. 2 to 4, various modified methods can be taken. For instance, after forming the groove by cut-processing the electrode material, the flexible carbon sheet is joined only to the top surface of the thus formed rib, etc. However, it is the most practical method that after adhering the flexible carbon sheet to the not-yet cut-processed electrode material, the cut-processing is carried out.

As the practical method for producing the composite electrode substrate somewhat different from those shown in FIGS. 3 and 4, for instance, in order to obtain the product of a construction wherein the flexible carbon sheet is adhered to the whole surface of the above-mentioned separator, at first, the flexible carbon sheet is adhered to the separator, and then the porous and carbonaceous electrode with the groove prepared by cut-processing or molding is joined to the separator via the flexible carbon sheet, and various other modified methods can be taken.

In addition, the hole 3 which becomes the flow passage 3 for supplying the reactant gas in the manifold (shown in FIGS. 5 to 8) can be opened in any optional stage of the process, and for instance, it can be opened by a suitable means before or after joining each of the manifold to the separator. Of course, it is preferable to suitably provide a flow passage 11 for connecting the above-mentioned hole 3 to the flow channel 5 of the electrode before joining the manifold to the separator.

Since in the thus obtained composite electrode substrate shown in FIGS. 1 to 8, the electrode and the separator have been joined together in one body by the flexible carbon sheet, and the gas-distributor, the peripheral sealer and the manifold have been joined to the separator in one body, the thus obtained composite electrode substrate is excellent in resistance to phosphoric acid and resistance to gas-leakage and is particularly suitable as the electrode substrate for a fuel cell of phosphoric acid type.

Namely, since in the composite electrode substrate for fuel cells according to the present invention (shown in FIGS. 1 to 4), the peripheral sealer on the side of the electrode parallel to the flow channel therein is joined to the substrate and formed in one body, it is not necessary, of course, to provide the special peripheral sealer thereon which has been regarded necessary for preventing the leakage of the reactant gas to the side of the cell.

In addition, in the composite electrode substrate shown in FIGS. 1 and 2, since the peripheral sealers have been evenly disposed and joined around the thin plate-like electrode substrate while holding the separator alternately in both sides, there is a reinforcing effect by such a construction, and as a result, the above-mentioned composite electrode substrate is excellent in the handling at the time of producing the fuel cell.

Further, in the composite electrode substrate shown in FIGS. 3 and 4, since the peripheral sealer and the gas-distributor both of which have been formed of the same material are opposite each other across the separator and the thermal expansion coefficient of the upper layer coincides with that of the lower layer, the thermal stress between the separator and the peripheral sealer and the thermal stress between the separator and the gas-distributor becomes the same, the warp and the distortion at the time of producing the composite electrode substrate are reduced in addition to the effect by interposing the flexible carbon sheet between the joining surfaces of the electrode and the separator.

In addition, since in the peripheral region of the thin plate-like electrode substrate, the peripheral sealer and the gas-distributor have been disposed and joined in face to face on the both surfaces of the separator while holding the separator, such a structure has a reinforcing effect, and as a result, the composite electrode substrate according to the present invention is extremely excellent in the handling at the time of producing the fuel cell.

Furthermore, in the composite electrode substrate provided with the manifold for a fuel cell according to the present invention (shown in FIGS. 5 to 8), since the manifold has been formed joined to the substrate in one body, it is possible to supply and discharge the necessary gas in the whole fuel cell through the each manifold sections of the stacked fuel cell in the case of simply introducing the reactant gas, etc. into the manifold, and accordingly it is not necessary, of course, to provide the outer manifold for supply and discharge of the reactant gas, etc., which has been regarded necessary in the ordinary fuel cell.

In addition, since the manifold has been evenly disposed and joined around the thin plate-like electrode substrate, such a structure has a reinforcing effect, and as a result, the composite electrode substrate with the manifold is excellent in the handling at the time of producing the fuel cell.

Further, in the composite electrode substrate shown in FIGS. 2 to 4, since the flexible carbon sheet interposed between the joining surfaces of the electrode and the separator as the buffering material has been disposed only on the joining (top) surface of the rib, the thickness of the flexible carbon sheet can be utilized as the effective height of the rib of the electrode. Namely, as compared to the electrode substrate in which the flexible carbon sheet has been disposed on the whole surface between the separator and the electrode, the thickness of one sheet of the electrode substrate (ordinarily 3.8 to 4 mm) can be reduced by 0.3 to 0.5 mm (in other words, 7 to 13%) while maintaining the same cross section of the flow channel of the reactant gas.

The present invention will be explained more in detail while referring to the non-limitative examples as follows:

EXAMPLE 1

After inserting a sheet of tetrafluoroethylene resin (made by NICHIAS Co., Ltd.) of a thickness of 50 μm between a carbon material (made by TOKAI Carbon Co., Ltd. of a bulk density of 1.85 g/cc) of 300 mm in width, 25 mm in length and 2 mm in thickness and a carbon material (made by SHOWA DENKO Co , Ltd., of a bulk density of 1.50 g/cc) of 300 mm in width, 300 mm in length and 0.8 mm in thickness, and after heating the thus composed materials to 350° C., the thus heated materials were press-joined at the same temperature under a pressure of 50 kgf/cm$^2$G.for 5 min. Thereafter, the thus hot-pressed materials were cooled to room temperature under normal pressure.

In order to determine the adhesive strength of the thus produced product, a jig was jointed to the both sides of the carbon composite material by using an epoxy resin, and the jig was pulled in the direction perpendicular to the surface of the carbon composite material. In the case of applying a force of 90 kgf/cm$^2$, the sheet of the TFE resin was not exfoliated and the jointed part of the epoxy resin was broken. From the above-mentioned results, the adhesive strength due to the TFE resin was presumed to be not less than 90 kgf/cm$^2$.

EXAMPLE 2

After applying a dispersion of tetrafluoroethylene resin(made by MITSUI Fluorochemical Co., Ltd.) onto the each surface to be joined of the same both carbon materials as those used in Example 1 and drying the thus applied dispersion, the surfaces thus applied with the dispersion were combined.

After heating the thus composed carbon materials to 350° C., the thus heated materials were press-joined for 5 min under a pressure of 50 kgf/cm$^2$G.at the same temperature, and then cooled to room temperature under the same pressure.

In the case of determining the adhesive strength in the same manner as in Example 1, the same results as in Example 1 were obtained.

EXAMPLE 3

After preparing a series of the joined composite materials by using the mixture of the same dispersion of tetrafluoroethylene resin as that used in Example 2 and carbon black (made by CABOT Co.) while changing the mixing ratio, the specific resistance of the thus prepared joining layers was determined and the results are shown as follows, the weight of the TFE resin being represented by the solid content of the TFE in the dispersion.

| Weight ratio of TFE resin to carbon black | Specific resistance (Ω cm) |
| --- | --- |
| 1:8 | 2.4 |
| 1:4 | 2.6 |
| 1:1 | 3.5 |
| 3:1 | 4.7 |
| 6:1 | 40 |

EXAMPLE 4

A mixture of dispersion of tetrafluoroethylene resin and carbon black (the mixing ratio 3/1) used in Example 3 was applied on the each joining surface of the same both carbon materials (having the same dimensions) as those used in Example 1, and the thus applied dispersion of the mixture was dried.

After combining the thus treated carbon materials and heating the composed materials to 350° C., they were press-joined for 5 min. at the same temperature under a pressure of 50 kgf/cm$^2$G. and then cooled to room temperature under the same pressure.

The adhesive strength of the thus produced product due to the TFE resin mixed with carbon black was determined in the same manner as in Example 1. The results was quite the same as that in Example 1.

Accordingly, the adhesive strength due to the TFE resin mixed with carbon black was presumed to be not less than 90 kgf/cm$^2$.

EXAMPLE 5

5-1: Electrode material:

After mixing 35% by weight of short carbon fibers (made by KUREHA KAGAKU KOGYO Co., Ltd., under the trade name of M-204S, of a mean diameter of 14 $\mu$m and a mean length of 400 $\mu$m), 30% by weight of a phenol resin (ASAHI-YUKIZAI Co., Ltd., under the trade name of RM-210) and 35% by weight of granules of polyvinyl alcohol (made by NIHON GOSEI KAGAKU KOGYO Co., Ltd. of a mean diameter of 180 $\mu$m), the mixture was supplied to a prescribed metal mold and molded under the conditions of the molding temperature of 135° C., the molding pressure of 35 kgf/cm$^2$G and the pressure holding time of 20 min to obtain a ribbed electrode material of 600 mm in width, 720 mm in length and 1.5 mm in thickness. The thickness of the rib and the thickness of the gas-diffusion part thereof were 1.0 mm and 0.5 mm, respectively.

5-2: Separator material:

A compact carbon plate of 0.8 mm in thickness (made by SHOWA DENKO Co., Ltd.) was cut into a piece of 720 mm in length and 720 mm in width to obtain the separator material.

5-3: Peripheral sealers:

A compact carbon plate of a bulk density of 1.85 g/cc and of a thickness of 1.5 mm (made by TOKAI Carbon Co., Ltd.) was cut into four pieces of 60 mm in width and 720 mm in length to obtain the peripheral sealers.

5-4: Tetrafluoroethylene resin:

A TEFLON ® sheet (made by NICHIAS Co., Ltd. of 0.05 mm in thickness) was used as the sheet of a fluorocarbon resin.

5-5: Flexible carbon sheet:

A GRAFOIL ® sheet (made by U.C.C., of a bulk density of 1.10 g/cc and of a thickness of 0.13 mm) was cut into pieces according to the dimension of the joining surface suitably.

After applying the adhesive of phenol resin series onto the both surface of the separator material and onto one of the sides of the GRAFOIL sheet, the thus applied adhesive was dried and the two materials were joined together at a temperature of 135° C. under a pressure of 10 kgf/cm$^2$G. for 20 min.

Thereafter, the same adhesive was applied onto the GRAFOIL surface of the thus joined separator material and dried, and in the same manner, the same adhesive was applied onto the rib surface of the electrode material and dried. Thereafter, the thus treated joined separator materials and the electrode material were joined together at 135° C. under a pressure of 10 kgf/cm$^2$G. for 20 min., and the thus joined materials were calcined at 2000° C. under a reduced pressure of 1 Torr and in an inert atmosphere.

Thereafter, the TEFLON sheet was inserted between the peripheral sealer and the separator, and the thus combined materials were press-joined by melt-adhesion of the TEFLON at 360° C. under a pressure of 20 kgf/cm$^2$G.

In order to determine the adhesive strength of the press-joined surface by the melt-adhesion, the test piece was adhered to a measure jig with an adhesive of epoxy resin series and a tensile test was carried out. Since the exfoliation did not occur at the joining part of the TEFLON sheet and occurred at the joining part of the adhesive of epoxy resin series, it was presumed that the adhesive strength was not less than 90 kgf/cm$^2$. Such a large adhesive strength of not less than 90 kgf/cm$^2$ is 30 times as large as 3 kgf/cm$^2$ of the adhesive strength in the case where carbon materials are adhered with a solution type adhesive of a conventional thermosetting resin together.

EXAMPLE 6

Instead of the TEFLON sheet of Example 5, a TEFLON dispersion (made by MITSUI Fluorochemical Co., Ltd., with an abbreviated name of PTFE, an aqueous solution containing 60% by weight of the TEFLON) is used and applied on the joining surface of the peripheral sealer and the separator evenly and dried in air. Thereafter, the materials were press-joined by melt-adhesion of the TEFLON under a pressure of 20 kgf/cm$^2$G. at 360° C. The adhesive strength of the product was the same as that in Example 5.

EXAMPLE 7

7-1: Electrode material:

Two pieces of a porous and carbonaceous plate-form material (made by KUREHA KAGAKU KOGYO Co., Ltd. under the trade name of KES-400, of 650 mm in width, 690 mm in length and 1.47 mm in thickness) were used as the electrode material.

7-2: Separator material

A compact carbon plate (made by SHOWA DENKO Co., Ltd., under the name of SG-2, of 0.6 mm in thickness) was cut into pieces of 690 mm in width and length, respectively, and the thus obtained piece was used as the separator material.

7-3: Peripheral sealers

A compact carbon plate (made by TOKAI Carbon Co., Ltd. of 1.85 g/cc in bulk density and 1.5 mm in thickness) was cut into four pieces of each 690 mm in length and 20 mm in width, and the thus prepared four pieces were used as the peripheral sealers.

7-4: Tetrafluoroethylene resin:

A TEFLON ® sheet used in Example 5 was cut into four pieces of each the dimension corresponding to the dimension (width and length) of the peripheral sealer, and the thus prepared four pieces were used as the sheet of a TFE resin.

7-5: Flexible carbon sheet:

A GRAFOIL ® used in Example 5 was cut into two pieces of each the dimension corresponding to the dimension of the joining surface, and the two pieces were used as the flexible carbon sheet.

After applying an adhesive of phenol resin series on one surface of each of the two electrode materials and on one surface of each of the two GRAFOIL ® sheets, the thus treated materials were dried and press-joined together at 140° C., under a pressure of 10 kgf/cm²G. for the pressure-holding time of 20 min.

In the next place, a plurality of grooves of a rectangular cross section and 2 mm in width and 1 mm in depth were prepared in parallel to each other with an interval of 4 mm on the surface of each of the electrode, to which the GRAFOIL ® sheet had been previously adhered, by cut-processing while using a diamond blade.

Thereafter, on the GRAFOIL ® remaining on the top of the rib forming the groove of the thus processed body, the above-mentioned adhesive was applied and dried.

In the same manner as above, the above-mentioned adhesive was applied on the surfaces of the separator, and dried. Thereafter, the respective remaining GRAFOIL ® surfaces of the two electrodes were joined to the both surfaces of the separator so that the plurality of the mutually parallel grooves of one of the electrodes are perpendicular to those of the another electrode, under the conditions of 140° C. in joining temperature, 10 kgf/cm²G. in joining pressure and 20 min in pressure-holding time. Then, the thus joined materials were calcined at 2000° C. under a reduced pressure of 1 Torr and in an inert atmosphere.

After calcination of the joined materials, the part of the electrode facing to the extended part of the separator to be joined to the peripheral sealer was cut off to expose the joining surface (extended part) of the separator to be joined to the peripheral sealer, and the TEFLON ® sheet was interposed between the joining surfaces of the peripheral sealer and the separator. Thereafter, the two materials were press-joined by melt-adhesion of the resin at 350° C. under a pressure of 20 kgf/cm²G. and the pressure-holding time of 20 min.

According to the above-mentioned procedure, a composite electrode substrate of 3.8 mm in thickness was obtained.

On measuring the adhesive strength of the press-joined surface by melt-adhesion of the thus produced composite electrode substrate in the same manner as in Example 1, the same results as in Example 1 was obtained and therefore, the adhesive strength was presumed to be not less than 90 kgf/cm².

Accordingly, the thus obtained composite electrode substrate can be said to be able to fit for the actual use as an electrode substrate for a fuel cell.

EXAMPLE 8

A composite electrode substrate was prepared in the similar manner as in Example 7 only except for using the following flexible carbon sheet instead of GRAFOIL ® sheet used in Example 7.

Namely, after dispersing 7 parts by weight of carbon fibers (made by KUREHA KAGAKU KOGYO Co., Ltd. by calcining isotropic pitch fibers at 2000° C. under the trade name of C 206S, 6 mm in length and 14 to 16 μm in diameter) and 1 part by weight of polyvinyl alcohol fibers (made by Co., Ltd. KURARE under the registered trade name of KURARE VINYLON ® VBP 105-2, 3 mm in length) into water and manufacturing into paper sheets by using an ordinary paper machine, the thus manufactured carbon paper sheet was dried, and the thus dried carbon paper sheet was impregnated with a methanolic 20% solution of a phenol resin. After removing the solvent from the thus impregnated carbon paper sheet by drying, the carbon paper sheet was thermally shaped in a metal mold at 130° C. under a pressure of 10 kgf/cm²G. for 20 min.and then the thus shaped paper sheet was calcined at 2000° C. under a reduced pressure of 1 Torr and in an inert atmosphere to obtain a thin plate-like sheet of 0.3 mm in thickness. The thus obtained sheet was 0.4 g/cc in bulk density, $8 \times 10^{-2}$ cm²/kgf in rate of compression strain and 5.3 mm in flexibility represented by radius of curvature. As in the case of Example 7, the sheet was suitably cut into two pieces, each of them having the dimension corresponding to the dimension of the joining surface with the electrode material.

By using the thus prepared flexible carbon sheet instead of the GRAFOIL ® sheet in Example 7, it was joined to the electrode under the conditions of 130° C., 10 kgf/cm²G. and 20 min. of the pressure-holding time.

Thereafter, as in the case of Example 7, after carrying out (1) preparing the groove by cut-processing the surface of the flexible carbon sheet adhered to each of the electrode material, (2) press-joining the electrode materials to the both surfaces of the separator by heating by a pressure, (3) calcining the composed materials and (4) cutting and removing the part of the carbon sheet and the electrode facing to the extended part of the separator to be joined to the peripheral sealer, the peripheral sealer and the separator were press-joined by melt-adhesion of the resin to obtain a composite electrode substrate of 4.14 mm in thickness for a fuel cell.

However, the conditions in joining the separator and the electrode material were 130° C., 10 kgf/cm²G. and 120 min. of the pressure holding time.

The thus obtained composite electrode was strong in adhesive strength as that in Example 7 and could be used actually.

EXAMPLE 9

The following three kinds of the composite electrode substrates mutually different in size were produced by using the following materials.

9-1: Electrode material:

The same material as that used in Example 7 as the electrode material was cut into three pairs of square pieces respectively having the length of one side of 100, 300 and 600 mm, and each pair pieces of the same size were used as the electrode material. The thermal expansion coefficient of these materials up to 400° C. was $2.5 \times 10^{-6}$/°C. on the average.

9-2: Separator material:

A compact carbon plate (made by SHOWA DENKO Co., Ltd. of 0.6 mm in thickness) was cut into three square pieces having respectively the length of the side of 100, 300 and 600 mm to obtain the respective separator materials, the thermal expansion coefficient thereof being $3.0 \times 10^{-6}$/°C.

9-3: Peripheral sealer and gas-distributor:

A compact carbon plate (made by TOKAI Carbon Co., Ltd. of 1.85 g/cc in bulk density and 1.5 mm in thickness) was cut into 6 groups of pieces respectively having the length and width of 100 mm × 20 mm, 60 mm × 20 mm, 300 mm × 20 mm, 260 mm × 20 mm, 600 mm × 20 mm and 560 mm × 20 mm, one group consisting of four pieces, and these pieces were used as the peripheral sealer and the gas-distributor.

On the pieces having shorter length (namely, 60 mm, 260 mm and 560 mm, respectively) used as the gas-distributor, after melt-adhering a TEFLON ® sheet thereto, the grooves of 8 mm in width and 0.6 mm in depth were parallely cut-processed with an interval of 12 mm. The thermal expansion coefficient of these all pieces was $2.5 \times 10^{-6}/°C$.

9-4: Tetrafluoroethylene resin:

Four pieces of the dimension corresponding to the dimension (width and length) of the peripheral sealer were prepared by cutting the TEFLON ® sheet used in Example 5, and the thus obtained four pieces of the TEFLON ® sheet were used as the sheet of the TFE resin.

9-5: Flexible carbon sheet:

Two pieces of the dimension corresponding to the dimension of the joining surface were prepared by suitably cutting the GRAFOIL ® sheet used in Example 5, and the thus prepared pieces were used as the flexible carbon sheet.

After applying an adhesive of phenol resin series onto one of the surfaces of each of the two electrode materials and one of the two surfaces of the GRAFOIL ® and drying the thus applied adhesive, the electrode materials and the GRAFOIL ® were joined together under the conditions of 140° C., 10 kgf/cm²G. and 20 min. of the pressure holding time.

In the next place, a plurality of grooves of 2 mm in width and 1 mm in depth parallel to each other and having a rectangular cross section were prepared at an interval of 4 mm on the surface of GRAFOIL ® sheet adhered to each of the two electrode materials by cut-processing while using a diamond blade.

Thereafter, the above-mentioned adhesive was applied on the remaining GRAFOIL ® surface of the thus processed body and dried.

Then, the respective remaining GRAFOIL ® surfaces of the two electrode materials were joined to the both surfaces of the separator so that the plurality of the parallel grooves in one of the electrode materials are perpendicular to those in the another electrode material, under the joining conditions of 140° C., 10 kgf/cm²G and 20 min of the pressure holding time, and the thus composed materials were calcined at 2000° C. under a reduced pressure of 1 Torr and in an inert atmosphere.

After calcination, the part of the electrode facing to the extended part of the separator to be joined to the peripheral sealer and the gas-distributor was removed by cutting to expose the joining surface of the separator to be joined to the peripheral sealer and the gas-distributor, and a TEFLON ® sheet was interposed between the joining surfaces of the peripheral sealer and the extended part of the separator. In addition, the gas-distributor to which a TEFLON ® sheet had been preliminarily melt-adhered was piled while facing the TEFLON ® sheet surface to the surface of the separator. Thereafter, the thus composed materials were press-joined by melt-adhesion under the conditions of 350° C., 20 kgf/cm²G. and 20 min. of the pressure holding time.

According to the above-mentioned procedures, the three kinds of the composite electrode substrates for fuel cells respectively having the length of the sides thereof of 100 mm, 300 mm and 600 mm were obtained.

In the thus obtained composite electrode substrate, the difference of the thermal expansion coefficient between the separator and the peripheral sealer and between the separator and the gas-distributor was $0.5 \times 10^{-6}/°C$, respectively.

The results of measuring the extent of the warp of each of the thus obtained composite electrode substrate were as follows:

| Length of the side of the electrode substrate (mm) | 100 | 300 | 600 |
|---|---|---|---|
| Warp (mm) | 0 | ≦0.03 | ≦0.05 |

In addition, on measuring the adhesive strength of the melt-adhered surfaces under a pressure in the same manner as in Example 1, the same results as in Example 1 were obtained and according to the results, the adhesive strength was presumed to be not less than 90 kgf/cm². According to the thus measurement, the thus obtained composite electrode substrate an be said to be able to fit for the actual use as an electrode substrate for fuel cells.

EXAMPLE 10

A composite electrode substrate was produced by using the same materials as in Example 9 except for using the flexible carbon sheet used in Example 8 instead of the GRAFOIL ® in Example 9 as follows.

Namely, the flexible carbon sheet used in Example 8 was cut by the same method as that of Example 9 into two pieces of the dimension corresponding to the dimension of the joining surface of the electrode material, and the thus obtained pieces were joined to the electrode material under the conditions of 130° C., 10 kgf/cm²G. and 20 min. of the pressure holding time.

In the next place, as in Example 9, the following procedures were carried out:

(1) groove-processing on the surface of the flexible carbon sheet adhered to each of the electrode materials, (2) thermal joining of the electrode materials to the both surfaces of the separator under a pressure, (3) calcination, (4) cutting off the part of the electrode facing to the extended part of the separator to be joined to the peripheral sealer and (5) joining of the peripheral sealer and the separator by the insertion of the TEFLON ® sheet, thereby (6) obtaining a composite electrode substrate of 4.14 mm in thickness for a fuel cell.

However, the joining of the separator material and the electrode materials was carried out under the conditions of 130° C., 10 kgf/cm²G. and 120 min. of the pressure holding time.

The thus obtained composite electrode substrate was, as that obtained in Example 9, large in the adhesive strength and was able to fit for the actual use as an electrode substrate for fuel cells.

EXAMPLE 11

11-1: Electrode material:

A ribbed electrode material of 600 mm in width, 600 mm in length and 1.5 mm in thickness was produced by using the same materials under the same conditions as in Example 5. The thickness of the rib was 1.0 mm and the thickness of the gas-diffusion part was 0.5 mm.

11-2: Separator material:

As the separator material, the same material with the same dimensions as in Example 5 was used.

11-3: Manifold material:

A compact carbon plate (made by TOKAI Carbon Co., Ltd., of a bulk density of 1.85 g/cc and 1.5 mm in thickness) was cut into two pieces of 60 mm in width and 720 mm in length and two pieces of 60 mm in width and 600 mm in length, and the each parts in the thus obtained four pieces of the plates corresponding to the each flow passages for supplying the reactant gas were cut to provide the flow passages (holes) for supplying the reactant gas therein. Then, a pair of the plates in the four pieces of the obtained plates with the holes were respectively provided with flow passages of the reactant gas for connecting the flow passage for supplying the reactant gas in the manifold to the flow channels of the reactant gas in the electrode, by cutting the parts corresponding thereto. Thus, the four pieces of manifold materials for joining to one surface of the separator were obtained. Also, by using the same method, dimension and material as those used in producing the above-mentioned manifold materials, the four pieces of manifold materials for joining to the another surface of the separator were obtained.

11-4: Tetrafluoroethylene resin:

The same TEFLON® as in Example 5 was used as the TFE resin.

11-5: Flexible graphite sheet:

The same GRAFOIL® sheet as in Example 5 was cut into pieces according to the dimensions of the joining surface suitably.

After applying an adhesive of phenol resin series onto the both surfaces of the separator material and onto one of the surfaces of the GRAFOIL® sheet, the thus applied adhesive was dried and the two materials were joined under the conditions of 135° C., 10 kgf/cm²G. and 20 min.

In the next step, the above-mentioned adhesive was applied onto the surface of the above-mentioned GRAFOIL® sheet and dried.

In the same manner, the above-mentioned adhesive was applied onto the rib surface of the above-mentioned electrode substrate and dried. Thereafter, the two materials were joined under the conditions of 135° C., 10 kgf/cm²G. and 20 min., and the thus joined materials were calcined at 2000° C. under a reduced pressure of 1 Torr and in an inert gaseous atmosphere.

In the next step, between the joining surfaces of the manifold material and the separator, the TEFLON® sheet was inserted and was joined by melt-adhesion under a pressure of 20 kgf/cm²G. at 360° C.

In order to determine the adhesive strength of press-joined surface by the melt-adhesion, the same test as in Example 1 was carried out. Since the same results as in Example 1 was obtained, the adhesive strength was presumed to be not less than 90 kgf/cm². Such a large adhesive strength of not less than 90 kgf/cm² is 30 times as large as 3 kgf/cm² of the adhesive strength in the case where the carbon materials are adhered with a solution type adhesive of a conventional thermosetting resin.

EXAMPLE 12

Instead of the TEFLON® sheet of Example 11, a TEFLON® dispersion (the same 60% by weight aqueous dispersion as in Example 2) was used, and it was applied on the joining surfaces of the manifold material and the separator evenly and dried in air. Thereafter, the two materials were joined together by melt-adhesion at 360° C. under a pressure of 20 kgf/cm²G. The adhesive strength was the same as in Example 11.

What is claimed is:

1. A composite electrode substrate for a fuel cell, comprising a separator, a porous and carbonaceous electrode provided with flow channels for a reactant gas and joined to both surfaces of the separator via a flexible carbon sheet, said separator being a calcined compact carbon material having a thickness of not more than 2 mm, a bulk density of not less than 1.40 g/cc, a gas-permeability of not more than $10^{-6}$ ml/cm²·hour·mmAq and an electric resistance of not more than 10 mΩ·cm, said composite electrode substrate further comprising:

a peripheral sealer formed of a calcined gas-impermeable and compact carbon material and disposed on a side of said electrode parallel to said flow channels therein or a peripheral sealer and gas-distributor assembly, wherein said peripheral sealer is disposed on the side of said electrode parallel to said flow channels therein and said gas-distributor is formed of a calcined gas-impermeable and compact carbon material and distributes the reactant gas on a side of said electrode perpendicular to said flow channels therein, or a manifold which is a calcined gas-impermeable and compact carbon plate and provided with a flow passage for supplying the reactant gas, said peripheral sealer, said peripheral sealer and gas-distributor assembly, or said manifold being joined to an extended part of said separator beyond said electrode via a tetrafluoroethylene resin layer, said peripheral sealer, said gas-distributor and said manifold being respectively a compact carbon material having a bulk density of not less than 1.40 g/cc and a gas-permeability of not more than $10^{-4}$ ml/cm²·hour·mmAq and difference of the thermal expansion coefficient of each material of said peripheral sealer, said gas-distributor and said manifold from that of the material of said separator being not more than $2 \times 10^{-6}/°C$.

2. A composite electrode substrate according to claim 1, wherein the calcining shrinkage of each material of said separator, said peripheral sealer, said gas-distributor and said manifold is not more than 0.2% in the case of calcining thereof at 2000° C.

3. A composite electrode substrate according to claim 1, wherein when the amount of gas-leakage through said peripheral sealer, said gas-distributor and said manifold, including the joining parts, as is represented by the formula ((amount of gas leakage)/(length of peripheral side)×(differential pressure)) is not more than $10^{-2}$ ml/cm·hour·mmAq. under a differential pressure of 500 mmAq.

4. A composite electrode substrate according to claim 1, wherein said porous and carbonaceous electrode has a bulk density of 0.3 to 0.9 g/cc, a gas-permeability of not less than 200 ml/cm²·hour·mmAq and an electric resistance of not more than 200 mΩ·cm after having been calcined at a temperature of not less than 800° C. under a reduced pressure and/or in an inert atmosphere.

5. A composite electrode substrate according to claim 1, wherein said flexible carbon sheet has been produced by compressing expanded graphite particles.

6. A composite electrode substrate according to claim 1, wherein said flexible carbon sheet comprises a material which has been produced by compressing expanded graphite particles obtained by subjecting graphite particles of not more than 5 mm in diameter to acid-treatment and further heating the thus acid-treated particles and has the thickness of not more than 1 mm, a bulk density of 1.0 to 1.5 g/cc, a rate of compression strain of not more than $0.35 \times 10^{-2}$ cm²/kgf and a flexibility of not being broken when bent to the radius of curvature of 20 mm.

7. A composite electrode substrate according to claim 1, wherein said flexible carbon sheet comprises a material obtained by carbonizing a composite material comprising carbon fibers of a mean length of not less than 1 mm and a binder and has a thickness of not more than 1 mm, a bulk density of 0.2 to 1.3 g/cc, a rate of compression strain of not more than $2.0 \times 10^{-1}$ cm$^2$/kgf and a flexibility of not being broken when bent to the radius of curvature of 10 mm, and in said flexible carbon sheet carbon lumps derived from said binder have been dispersed in the matrix of said carbon fibers and restrain a plurality of carbon fibers and said carbon fibers are combined with said carbon lump so as to freely slide through said carbon lump.

8. A composite electrode substrate according to claim 1, wherein said porous and carbonaceous electrode materials have been joined to the both surfaces of said separator via said flexible carbon sheet so that said flow channels of the reactant gas in one of said electrodes are perpendicular to those in another said electrode and a pair of said peripheral sealer have been disposed to be adjacent to the periphery of said electrode parallel to said flow channels of the reactant gas in said electrode, said peripheral sealer having been joined to the extended part of said separator beyond said electrode via said tetrafluoroethylene resin layer.

9. A composite electrode substrate according to claim 1, comprising said separator, the porous and carbonaceous electrodes provided with a plurality of grooves forming flow channels of the reactant gas, said electrode being joined to the both surfaces of said separator so that said flow channels in one of said electrodes are perpendicular to those in another said electrode, ribs forming said grooves of electrode and said separator being joined together via said flexible carbon sheet disposed on joining surfaces of said ribs, and a pair of said peripheral sealers on the side of said electrode parallel to said flow channels therein, which are joined to the extended part of said separator beyond said electrode via said tetrafluoroethylene resin layer.

10. A composite electrode substrate according to claim 1, comprising said separator, said porous and carbonaceous electrodes provided a plurality of grooves forming said flow channels of the reactant gas on one side thereof and one flat surface on the other side, said electrode being joined to the both surfaces of said separator via said flexible carbon sheet so that said flow channels of the reactant gas in one of said electrodes are perpendicular to those in another said electrode, and a pair of said peripheral sealers on the side of said electrode parallel to said flow channels therein and a pair of said gas-distributors on the side of said electrode perpendicular to said flow channels therein, said peripheral sealers and said gas-distributors being joined to the extended part of said separator beyond said electrode via said tetrafluoroethylene resin layer.

11. A composite electrode substrate according to claim 1, wherein parts of said manifold have been joined via a layer of said tetrafluoroethylene resin.

* * * * *